United States Patent
Gamble et al.

(10) Patent No.: US 10,655,420 B2
(45) Date of Patent: May 19, 2020

(54) BLOWOUT PREVENTION SYSTEM INCLUDING BLIND SHEAR RAM

(71) Applicant: General Electric Company, Schenectady, NY (US)

(72) Inventors: Jamie Clay Gamble, Houston, TX (US); Bodhayan Dev, Niskayuna, NY (US); Deepak Trivedi, Halfmoon, NY (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 0 days.

(21) Appl. No.: 15/464,437

(22) Filed: Mar. 21, 2017

(65) Prior Publication Data

US 2018/0274322 A1 Sep. 27, 2018

(51) Int. Cl.
*E21B 33/06* (2006.01)
*F16K 3/02* (2006.01)
*F16J 15/02* (2006.01)
*F16J 15/12* (2006.01)

(52) U.S. Cl.
CPC .......... *E21B 33/063* (2013.01); *E21B 33/062* (2013.01); *F16K 3/0227* (2013.01); *F16J 15/022* (2013.01); *F16J 15/121* (2013.01)

(58) Field of Classification Search
CPC .......... E21B 29/00; E21B 29/08; E21B 33/03; E21B 33/06; E21B 33/062; E21B 33/063; F16K 3/0227; F16K 3/0209; F16K 3/0218; F16K 3/0236; F16K 3/0263; F16K 3/0281; F16K 3/029; F16J 15/022; F16J 15/121; F16J 15/122; F16J 15/123; F16J 15/125

USPC .............. 277/638, 639, 324, 325, 343, 344, 277/651–653
See application file for complete search history.

(56) References Cited

U.S. PATENT DOCUMENTS

| | | | | |
|---|---|---|---|---|
| 3,692,316 A | * | 9/1972 | Bishop | E21B 33/062 251/1.3 |
| 3,817,326 A | | 6/1974 | Meynier, III | |
| 3,897,039 A | | 7/1975 | Le Rouax | |
| 3,915,426 A | | 10/1975 | LeRouax | |
| 4,026,565 A | * | 5/1977 | Jelinek | F16J 15/121 277/639 |

(Continued)

OTHER PUBLICATIONS

Canal, J.R., "BOP Shear Rams for Hydrogen Sulfide Service," SPE Drilling Engineering, vol. 4, Issue.4, pp. 347-350 (Dec. 1989).

(Continued)

*Primary Examiner* — Hailey K. Do
(74) *Attorney, Agent, or Firm* — Hogan Lovells US LLP

(57) ABSTRACT

A seal for a blind shear ram is configured to extend between a first carrier and a second carrier of the blind shear ram. The seal includes a curved portion and an elastic layer extending through the curved portion. The elastic layer is configured to contact at least one of the first carrier and the second carrier to seal a wellbore when the first carrier and the second carrier are in a closed position. The elastic layer has a first elasticity. The seal also includes an anti-extrusion structure coupled to the elastic layer. The anti-extrusion structure extends through the curved portion. The anti-extrusion structure has a second elasticity less than the first elasticity. The anti-extrusion structure defines a plurality of slits to facilitate the anti-extrusion structure extending through the curved portion.

20 Claims, 7 Drawing Sheets

(56) References Cited

U.S. PATENT DOCUMENTS

| | | | |
|---|---|---|---|
| 4,240,503 A | 12/1980 | Holt, Jr. et al. | |
| 4,347,898 A | 9/1982 | Jones | |
| 4,398,729 A * | 8/1983 | Bishop | E21B 33/062 251/1.3 |
| 4,444,404 A | 4/1984 | Parks, Jr. | |
| 4,508,312 A * | 4/1985 | Taylor | E21B 33/062 251/1.3 |
| 4,647,002 A | 3/1987 | Crutchfield | |
| 4,690,411 A * | 9/1987 | Van Winkle | E21B 33/062 251/1.3 |
| 5,127,623 A * | 7/1992 | McDugle | E21B 33/062 251/1.3 |
| 5,713,581 A | 2/1998 | Carlson et al. | |
| 5,879,010 A | 3/1999 | Nilkanth et al. | |
| 5,906,375 A * | 5/1999 | Young | E21B 33/063 277/325 |
| 5,944,110 A | 8/1999 | Watts et al. | |
| 6,158,505 A | 12/2000 | Araujo | |
| 6,267,383 B1 | 7/2001 | Morvant | |
| 6,302,405 B1 | 10/2001 | Edwards | |
| 6,338,492 B1 * | 1/2002 | Schilling | H01M 8/242 277/630 |
| 6,394,460 B1 * | 5/2002 | Leggett | E21B 33/062 277/324 |
| 6,719,042 B2 | 4/2004 | Johnson et al. | |
| 7,055,829 B2 | 6/2006 | Russell | |
| 7,207,382 B2 * | 4/2007 | Schaeper | E21B 33/063 166/55 |
| 7,234,530 B2 | 6/2007 | Gass | |
| 7,243,713 B2 * | 7/2007 | Isaacks | E21B 33/063 166/55 |
| 7,252,293 B2 * | 8/2007 | Happel | F16L 21/03 277/575 |
| 7,354,026 B2 | 4/2008 | Urrutia | |
| 8,186,691 B2 * | 5/2012 | Baxi | F16J 15/127 277/609 |
| 8,479,809 B2 | 7/2013 | Farquhar | |
| 8,567,490 B2 | 10/2013 | Van Winkle | |
| 8,770,274 B2 | 7/2014 | Van Winkle | |
| 8,833,772 B2 * | 9/2014 | Sasaki | H05K 5/061 277/630 |
| 2016/0097250 A1 | 4/2016 | Bleck et al. | |
| 2017/0037695 A1 | 2/2017 | Sedens et al. | |
| 2017/0058628 A1 | 3/2017 | Van Wijk et al. | |

OTHER PUBLICATIONS

Mcwhorter, D.J., "High-Temperature Variable Bore Ram Blowout Preventer Sealing," 25th Annual Offshore Technology Conference, vol. 4, pp. 712-718 (May 3-6, 1993).

International Search Report and Written Opinion issued in connection with corresponding PCT Application No. PCT/US2018/018140 dated May 25, 2018.

Dev, B., et al., Blowout Prevention System Including Blind Shear Ram, GE Co-Pending U.S. Appl. No. 15/474,365, filed Mar. 30, 2017.

Trivedi, D., et al., Blowout Prevention System Including Blind Shear Ram, GE Co-Pending U.S. Appl. No. 15/474,428, filed Mar. 30, 2017.

* cited by examiner

BLOWOUT PREVENTION SYSTEM INCLUDING BLIND SHEAR RAM

BACKGROUND

The field of the disclosure relates generally to a blowout prevention (BOP) system for oil and gas wells, and more particularly to a BOP system including a blind shear ram.

Many known oil and gas production systems include a blowout prevention (BOP) system that seals a wellbore to inhibit release of materials through the wellbore. At least some known BOP systems include blind shear rams including carriers that are movable between a first position and a second position. During operation, the blind shear rams cut a pipe extending through the wellbore and the carriers move to the second position to seal the wellbore. In at least some known blind shear rams, a seal extends between the carriers to inhibit leakage of materials when the carriers seal the wellbore.

Accordingly, there is a need for a seal for blind shear rams that is capable of withstanding pressures in the wellbore and providing sufficient contact pressure to completely seal the wellbore.

BRIEF DESCRIPTION

In one aspect, a seal for a blind shear ram is provided. The seal is configured to extend between a first carrier and a second carrier of the blind shear ram. The seal includes a curved portion and an elastic layer extending through the curved portion. The elastic layer is configured to contact at least one of the first carrier and the second carrier to seal a wellbore when the first carrier and the second carrier are in a closed position. The elastic layer has a first elasticity. The seal also includes an anti-extrusion structure coupled to the elastic layer. The anti-extrusion structure extends through the curved portion. The anti-extrusion structure has a second elasticity less than the first elasticity. The anti-extrusion structure defines a plurality of slits to facilitate the anti-extrusion structure extending through the curved portion.

In another aspect, a blind shear ram for a blowout prevention system is provided. The blind shear ram includes a casing configured to couple to a stack and receive at least one pipe and at least one cable. The at least one pipe and the at least one cable extend through a wellbore defined by the stack. The blind shear ram also includes an upper carrier including an upper blade and a lower carrier including a lower blade. At least one of the upper carrier and the lower carrier is configured to move relative to the casing such that the upper carrier and the lower carrier are positionable in a first position in which the upper carrier and the lower carrier are spaced apart and a second position in which the upper carrier and the lower carrier seal the wellbore. The blind shear ram further includes a seal extending between the upper carrier and the lower carrier. The seal includes a curved portion and an elastic layer extending through the curved portion. The elastic layer is configured to contact at least one of the first carrier and the second carrier to seal a wellbore when the first carrier and the second carrier are in a closed position. The elastic layer has a first elasticity. The seal also includes an anti-extrusion structure coupled to the elastic layer. The anti-extrusion structure extends through the curved portion. The anti-extrusion structure has a second elasticity less than the first elasticity. The anti-extrusion structure defines a plurality of slits to facilitate the anti-extrusion structure extending through the curved portion.

In yet another aspect, a method of assembling a seal for a blind shear ram is provided. The seal is configured to extend between a first carrier and a second carrier of the blind shear ram. The method includes forming a curved portion between a base portion and a leg portion such that the leg portion extends at an angle relative to the base portion. The method also includes providing an elastic layer extending through the base portion and the curved portion. The elastic layer is configured to contact at least one of the first carrier and the second carrier to seal a wellbore when the first carrier and the second carrier are in a closed position. The elastic layer has a first elasticity. The method further includes coupling an anti-extrusion structure to the elastic layer. The anti-extrusion structure extends through the base portion and the curved portion. The anti-extrusion structure has a second elasticity less than the first elasticity. The method also includes forming a plurality of slits in the anti-extrusion structure to facilitate the anti-extrusion structure extending through the curved portion.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "extrude" and "extrusion" refers to displacement by external forces. The term "anti-extrusion" refers to resistance to displacement by external forces. As used herein, the term "elastic" refers to the ability to return to a neutral shape after deformation.

The methods and systems described herein provide a seal that withstands extrusion forces in the wellbore and provides sufficient contact pressure to completely seal the wellbore. For example, embodiments of the seal include elastic layers and an anti-extrusion member coupled to the elastic layers to inhibit extrusion of the elastic layers. The anti-extrusion member extends between the elastic layers such that the anti-extrusion member supports the elastic layers. In addition, the outermost elastic layer covers the anti-extrusion member and contacts surfaces adjacent the seal to prevent materials moving between the seal and the surfaces. In some embodiments, the anti-extrusion member and the elastic layers are configured to increase bonding between the anti-extrusion member and the elastic layers. As a result, the seal provides increased contact pressure and resists extrusion forces due to pressures in the wellbore.

Figure 1:
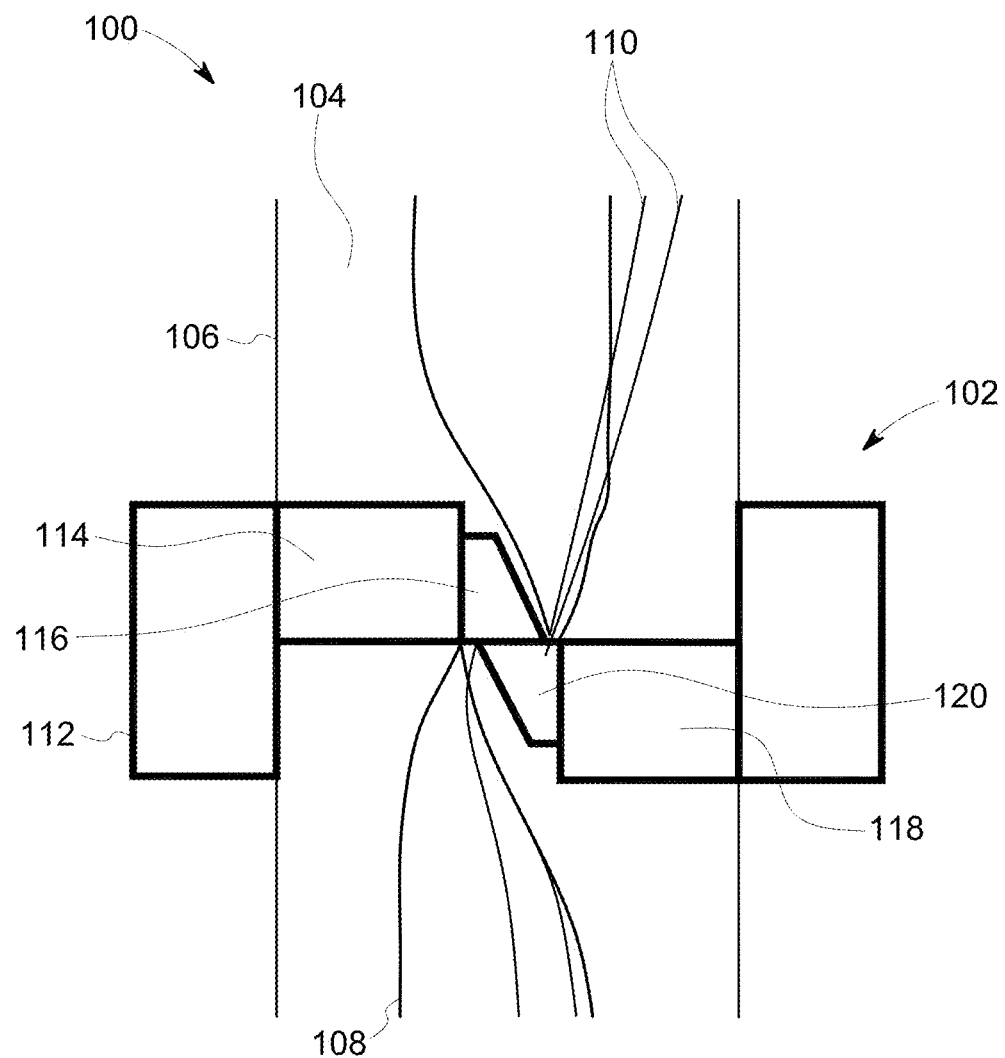
FIG. 1 is a schematic view of an exemplary blowout prevention (BOP) system including a blind shear ram.

FIG. 1 is a schematic view of an exemplary blowout prevention (BOP) system 100 including a blind shear ram 102. BOP system 100 is configured to seal a wellbore 104 at least partially defined by a stack 106 and inhibit material flowing through wellbore 104. In particular, blind shear ram 102 is configured to cut a pipe 108 and cables 110 extending through wellbore 104 and seal wellbore 104. In alternative embodiments, BOP system 100 has any configuration that enables BOP system 100 to operate as described herein. For example, in some embodiments, BOP system 100 includes a shear ram and/or an annular blowout preventer.

Figure 2:
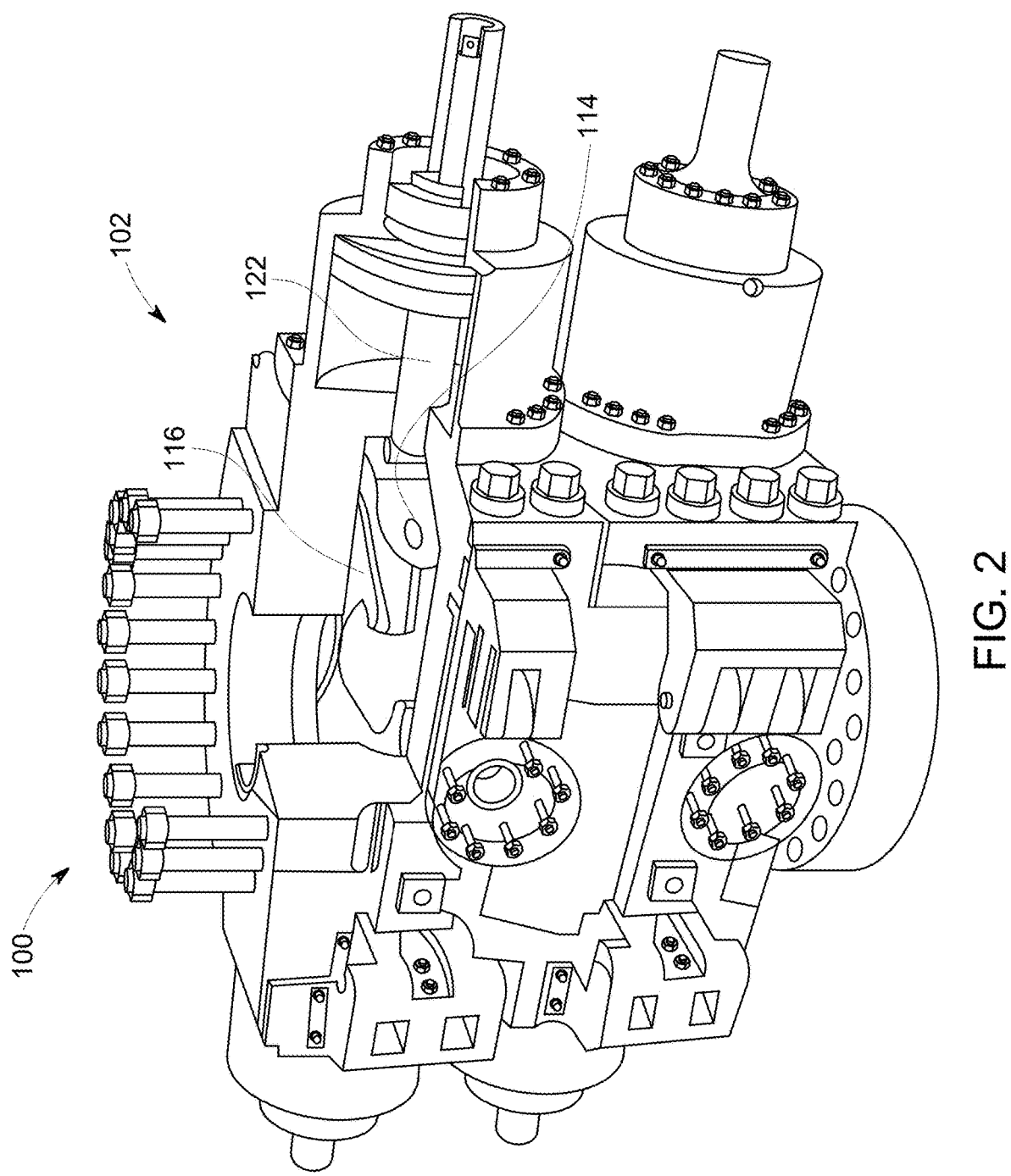
FIG. 2 is a perspective view of the BOP system shown in FIG. 1.
Figure 3:
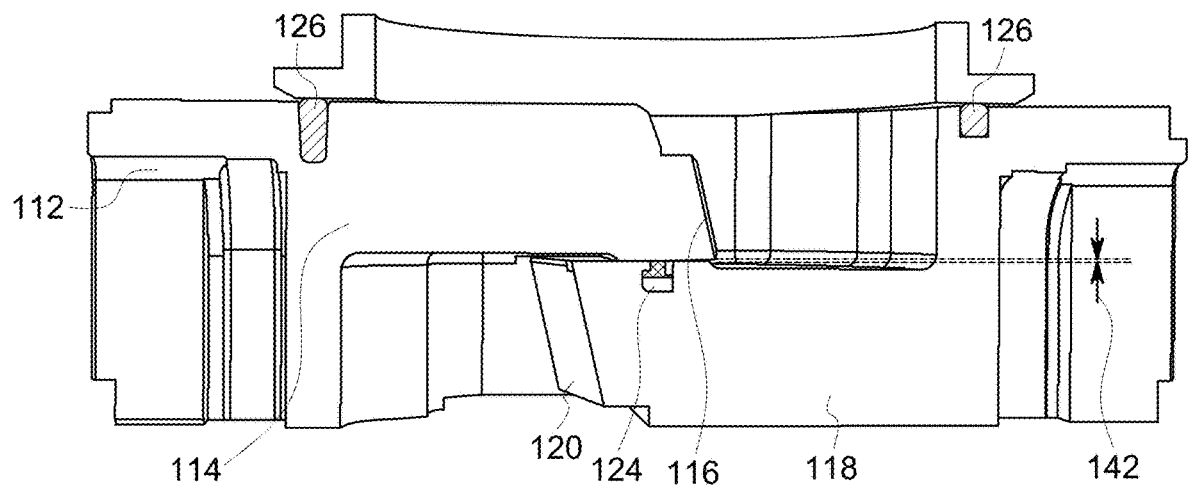
FIG. 3 is a sectional view of the blind shear ram shown in FIGS. 1 and 2.

FIG. 2 is a perspective view of BOP system 100 including blind shear ram 102. FIG. 3 is a sectional view of blind shear ram 102. Blind shear ram 102 includes a casing 112, an upper carrier 114, an upper blade 116, a lower carrier 118, a lower blade 120, and at least one ram actuator 122. In the exemplary embodiment, ram actuators 122 are coupled to each of upper carrier 114 and lower carrier 118. Ram actuators 122 are configured to move upper carrier 114 and lower carrier 118 relative to casing 112 such that upper carrier 114 and lower carrier 118 are positionable in a first position, e.g., an opened position, and a second position, e.g., a closed position. In the exemplary embodiment, ram actuators 122 are hydraulic. In alternative embodiments, blind shear ram 102 includes any ram actuator 122 that enables blind shear ram 102 to operate as described herein.

In reference to FIG. 1, casing 112 is configured to couple to stack 106 and receive pipe 108 and cables 110. When upper carrier 114 and lower carrier 118 are in the first position, upper carrier 114 and lower carrier 118 are spaced apart on opposite sides of casing 112 such that pipe 108 and cables 110 pass between upper carrier 114 and lower carrier 118. As upper carrier 114 and lower carrier 118 move from the first position to the second position, upper carrier 114 and lower carrier 118 move towards each other and compress pipe 108 and cables 110. Upper blade 116 and lower blade 120 are configured to contact and cut pipe 108 and cables 110 as upper carrier 114 and lower carrier 118 move from the first position to the second position. In the second position, upper carrier 114 and lower carrier 118 seal wellbore 104. In the exemplary embodiment, at least one seal 124 (shown in FIG. 3) extends between upper carrier 114 and lower carrier 118 to facilitate sealing wellbore 104 when upper carrier 114 and lower carrier 118 are in the second position. In addition, upper seals 126 extend through casing 112 to facilitate sealing wellbore 104. In alternative embodiments, wellbore 104 is sealed in any manner that enables BOP system 100 to operate as described herein.

In reference to FIG. 3, in the exemplary embodiment, upper carrier 114 and lower carrier 118 define a gap 142 therebetween. In some embodiments, gap 142 is in a range about 0.025 millimeters (mm) (0.001 inches (in.)) to about 0.500 mm (0.020 in.). In alternative embodiments, blind shear ram 102 includes any gap that enables blind shear ram 102 to operate as described herein.

Figure 4:
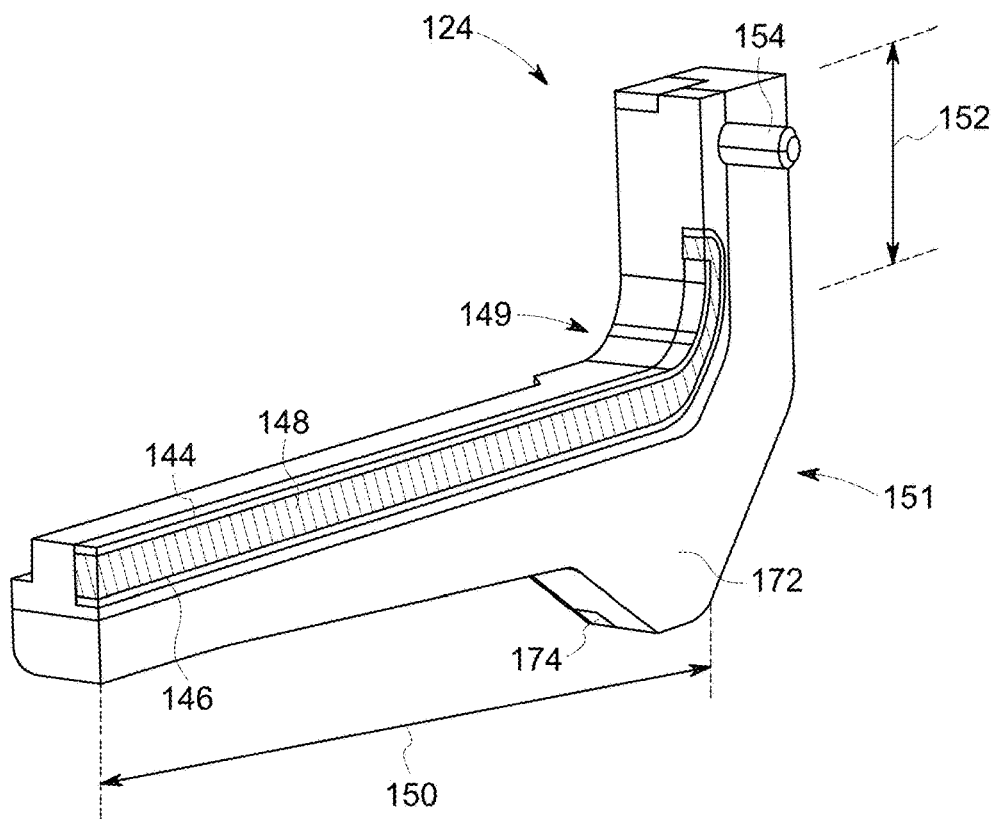
FIG. 4 is a perspective view of a portion of an exemplary seal of the blind shear ram shown in FIG. 3.

FIG. 4 is a perspective view of a portion of seal 124 for blind shear ram 102 (shown in FIG. 3). In reference to FIGS. 1 and 3, seal 124 extends between upper carrier 114 and lower carrier 118 to seal wellbore 104 when upper carrier 114 and lower carrier 118 are in the second position. In particular, seal 124 is coupled to and extends laterally along lower carrier 118. Seal 124 extends from a surface of lower carrier 118 and contacts a surface of upper carrier 114 to seal wellbore 104 when upper carrier 114 and lower carrier 118 are in the second position. In alternative embodiments, seal 124 is coupled to any portion of blind shear ram 102 that enables blind shear ram 102 to operate as described herein. For example, in some embodiments, seal 124 is coupled to upper carrier 114.

In reference to FIG. 4, in the exemplary embodiment, seal 124 includes an outer layer 144, an inner layer 146, an anti-extrusion structure 148, a base portion 150, leg portions 152, and an insert 154. Outer layer 144 forms an outermost portion of seal 124 and is configured to contact upper carrier 114 (shown in FIG. 3). Inner layer 146 forms an inner portion of seal 124. Outer layer 144 and inner layer 146 are spaced apart and anti-extrusion structure 148 extends between outer layer 144 and inner layer 146. Accordingly, seal 124 is a layered structure. In alternative embodiments, seal 124 has any configuration that enables blind shear ram 102 (shown in FIG. 3) to operate as described herein.

In the exemplary embodiment, anti-extrusion structure 148 has a stiffness that is greater than the stiffness of outer layer 144 and the stiffness of inner layer 146. For example, in some embodiments, anti-extrusion structure 148 has a stiffness in a range of about 35 megapascal (MPa) (5,000 pounds per square inch (psi)) to about 138 MPa (20,000 psi) at a temperature of approximately 23° Celsius (C) (73° Fahrenheit (F)) and a stiffness in a range of about 14 MPa (2,000 psi) to about 55 MPa (8,000 psi) at a temperature of approximately 121° C. (250° F.). Outer layer 144 and inner layer 146 each have a stiffness in a range of about 7 MPa (1,000 psi) to about 28 MPa (4,000 psi) at a temperature of approximately 23° C. (73° F.). Outer layer 144 and inner layer 146 each have a stiffness in a range of about 3 MPa (500 psi) to about 14 MPa (2,000 psi) at a temperature of approximately 121° C. 250° F. In alternative embodiments, seal 124 has any stiffness that enables blind shear ram (shown in FIG. 3) to operate as described herein.

Also, in the exemplary embodiment, anti-extrusion structure 148 resists extrusion forces 149 on outer layer 144 and inner layer 146. Accordingly, anti-extrusion structure 148 prevents lateral displacement of seal 124 due to extrusion forces 149. In addition, the contact pressure of seal 124 on upper carrier 114 (shown in FIG. 3) is increased because outer layer 144 covers anti-extrusion structure 148. In particular, outer layer 144 has a higher elasticity and a lower stiffness than anti-extrusion structure 148 and provides an increased contact pressure between seal 124 and upper carrier 114 (shown in FIG. 3). Accordingly, seal 124 provides a complete seal and prevents materials passing between seal 124 and upper carrier 114. Anti-extrusion structure 148 has a lower elasticity and a higher stiffness than outer layer 144 and inner layer 146. Anti-extrusion structure 148 is positioned between outer layer 144 and inner layer 146 to resist deformation of seal 124 due to pressures within wellbore 104 (shown in FIG. 1). For example, in some embodiments, seal 124 is configured to withstand pressures up to 15,000 pounds per square inch (psi).

Figure 5:
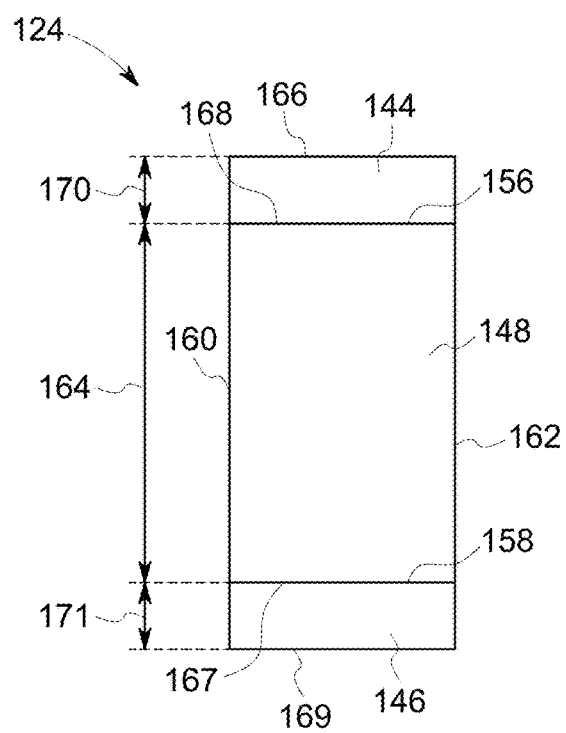
FIG. 5 is a sectional view of a portion of the seal shown in FIG. 4 including an outer layer, an inner layer, and an anti-extrusion structure.

FIG. 5 is a sectional view of a portion of seal 124 including outer layer 144, inner layer 146, and anti-extrusion structure 148. In the exemplary embodiment, anti-extrusion structure 148 includes a first surface 156, a second surface 158, a third surface 160, and a fourth surface 162. First surface 156 and second surface 158 are opposite each other. First surface 156 contacts outer layer 144 and second surface 158 contacts inner layer 146. Third surface 160 and fourth surface 162 extend between first surface 156 and second surface 158. Accordingly, anti-extrusion structure 148 has a quadrilateral cross-sectional shape. In addition, anti-extrusion structure 148 is elongate. First surface 156 and second surface 158 define a thickness 164 of anti-extrusion structure 148 therebetween. In some embodiments, thickness 164 is in a range of about 13 mm (0.5 in.) to about 127 mm (5 in.). In alternative embodiments, anti-extrusion structure 148 has any shape that enables seal 124 to operate as described herein.

Moreover, in the exemplary embodiment, outer layer 144 includes a first surface 166 and a second surface 168. Second surface 168 is opposite first surface 166. First surface 166 is configured to contact upper carrier 114 (shown in FIG. 3) and second surface 168 is configured to contact anti-extrusion structure 148. First surface 166 and second surface 168 define a thickness 170 of outer layer 144 therebetween. In some embodiments, thickness 170 is in a range of about 1.3 mm (0.05 in.) to about 25.4 mm (1 in.). Thickness 170 facilitates outer layer 144 covering anti-extrusion structure 148 and providing a desired contact pressure between upper carrier 114 (shown in FIG. 3) and seal 124. In alternative embodiments, seal 124 includes any outer layer 144 that enables seal 124 to operate as described herein.

In addition, in the exemplary embodiment, inner layer 146 includes a first surface 167 and a second surface 169. Second surface 169 is opposite first surface 167. First surface 167 is configured to contact anti-extrusion structure 148. First surface 167 and second surface 169 define a thickness 171 of inner layer 146 therebetween. In some embodiments, thickness 171 is in a range of about 1.3 mm (0.05 in.) to about 25.4 mm (1 in.). In alternative embodiments, seal 124 includes any inner layer 146 that enables seal 124 to operate as described herein.

Also, in the exemplary embodiment, seal 124 includes different materials. For example, in some embodiments, outer layer 144 and inner layer 146 include elastomers such as hydrogenated nitrile butadiene rubber (HNBR), fluoroelastomers, and carboxylated nitrile rubbers (XNBR). In addition, in some embodiments, anti-extrusion structure 148 includes thermoplastics such as nylon and polyether ether ketone (PEEK). In alternative embodiments, seal 124 includes any material that enables seal 124 to operate as described herein. For example, in some embodiments, seal 124 includes, without limitation, plastics, elastomers, metals, and combinations thereof.

In reference to FIG. 4, in the exemplary embodiment, leg portions 152 extend from opposite ends of base portion 150 at angles relative to base portion 150. Leg portions 152 are coupled to base portion 150 by elbows 151. Accordingly, seal 124 is U-shaped. While only one leg portion 152 and one elbow 151 are shown in FIG. 4, in the exemplary embodiment, seal 124 is substantially symmetric such that leg portions 152 and elbows 151 coupled to opposite ends of base portion 150 are the same. Anti-extrusion structure 148 extends through base portion 150, through elbows 151, and into leg portions 152. Outer layer 144 and inner layer 146 extend along anti-extrusion structure 148 through base portion 150, through elbows 151, and into leg portions 152. In alternative embodiments, seal 124 includes any portion that enables seal 124 to operate as described herein.

Moreover, in the exemplary embodiment, seal 124 further includes a body 172 and a cap 174. Body 172 extends along and below inner layer 146. Body 172 includes an elastic material and facilitates seal 124 sealing wellbore 104 (shown in FIG. 1). Cap 174 is positioned on a lower portion of body 172 and is spaced from outer layer 144, anti-extrusion structure 148, and inner layer 146. Cap 174 includes a relatively rigid material. In alternative embodiments, seal 124 includes any component that enables seal 124 to operate as described herein.

Figure 6:
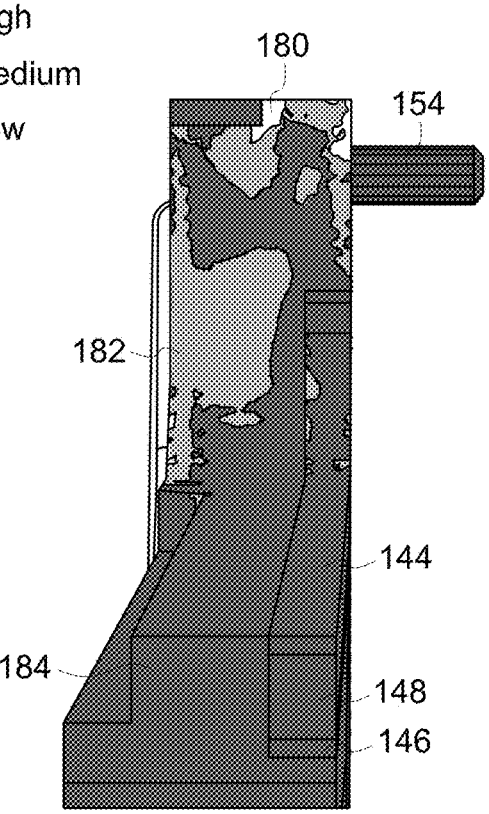
FIG. 6 is a schematic perspective view of the seal shown in FIG. 4 indicating areas of strain during operation of the BOP system shown in FIG. 1.

FIG. 6 is a schematic perspective view of seal 124 indicating areas of strain during operation of BOP system 100 (shown in FIG. 1). During operation, seal 124 includes high strain areas 180, medium stain areas 182, and low strain areas 184. Seal 124 is more prone to extrude in high strain areas 180 than in medium strain areas 182 and low strain areas 184. Due to anti-extrusion structure 148, high strain areas 180 are significantly reduced and/or eliminated. In particular, anti-extrusion structure 148 reduces strain in base portion 150 and elbow 151 such that base portion 150 and elbow 151 do not include high strain areas 180. As a result, seal 124 has a reduced risk of extrusion.

Figure 7:
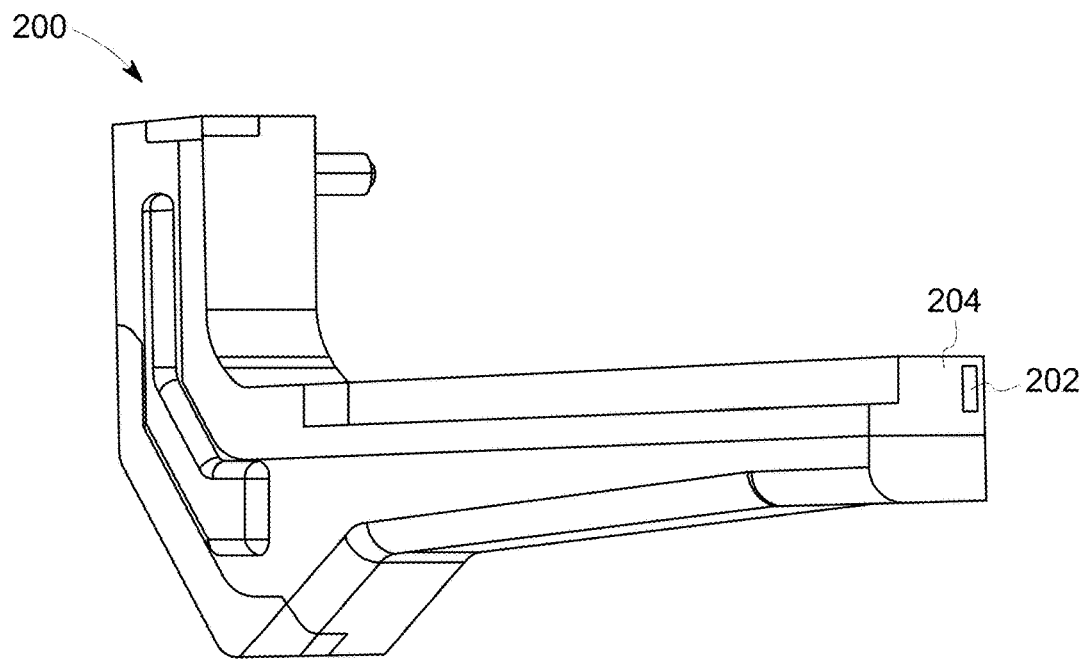
FIG. 7 is a perspective view of a portion of an alternative exemplary seal for the blind shear ram shown in FIG. 3.
Figure 8:
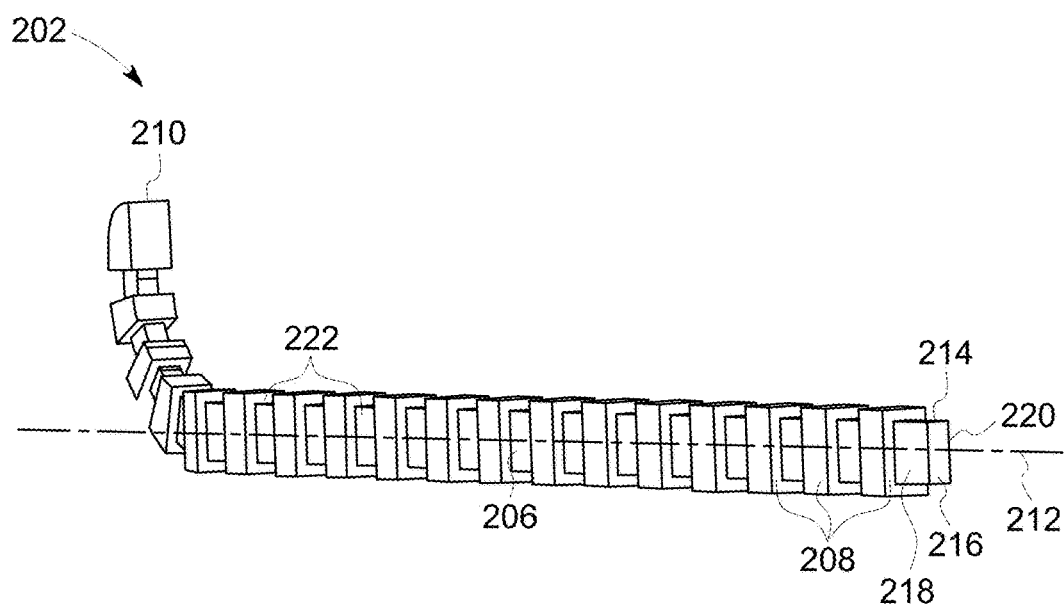
FIG. 8 is a perspective view of a portion of an anti-extrusion structure of the seal shown in FIG. 7.

FIG. 7 is a perspective view of a portion of a seal 200 for blind shear ram 102 (shown in FIG. 3). FIG. 8 is a perspective view of a portion of an anti-extrusion structure 202 of seal 200. Seal 200 includes anti-extrusion structure 202 and an elastic layer 204. Elastic layer 204 has a first stiffness. Anti-extrusion structure 202 has a second stiffness greater than the first stiffness. Accordingly, anti-extrusion structure 202 prevents extrusion of elastic layer 204 during operation. In alternative embodiments, seal 200 includes any layer that enables seal 200 to operate as described herein.

In reference to FIG. 8, in the exemplary embodiment, anti-extrusion structure 202 includes an elongate member 206 and a plurality of ribs 208. Elongate member 206 includes opposite ends 210, a first surface 214, a second surface 216, a third surface 218, and a fourth surface 220.

First surface 214, second surface 216, third surface 218, and fourth surface 220 extend between ends 210 and about a longitudinal axis 212 of elongate member 206 to define a perimeter of elongate member 206. In alternative embodiments, anti-extrusion structure 202 includes any elongate member 206 that enables anti-extrusion structure 202 to operate as described herein.

Also, in the exemplary embodiment, ribs 208 extend about the entire perimeter defined by first surface 214, second surface 216, third surface 218, and fourth surface 220 of elongate member 206. Ribs 208 are evenly spaced along elongate member 206 from first end 210 to second end 210. Ribs 208 define a plurality of spaces 222 to receive portions of elastic layer 204 and facilitate anti-extrusion structure 202 bonding to elastic layer 204. In the exemplary embodiment, each rib 208 has a thickness in a range of about 2 mm (0.08 in.) to about 20 mm (0.8 in.). In addition, in the exemplary embodiment, adjacent ribs 208 are spaced apart by a distance in a range of about 5 mm (0.2 in.) to about 50 mm (2 in.). In alternative embodiments, anti-extrusion structure 202 includes any rib 208 that enables anti-extrusion structure 202 to operate as described herein.

In addition, in the exemplary embodiment, ribs 208 are rectangular. Accordingly, ribs 208 are symmetric about longitudinal axis 212. Ribs 208 are substantially similar to each other and are uniformly spaced along elongate member 206. In alternative embodiments, ribs 208 have any shape that enables seal 200 to operate as described herein. For example, in some embodiments, anti-extrusion structure 202 includes ribs 208 having different shapes. In further embodiments, at least some ribs 208 are irregular.

Moreover, in the exemplary embodiment, elongate member 206 and ribs 208 include thermoplastics such as nylon and polyether ether ketone (PEEK). In addition, elongate member 206 and ribs 208 are integrally formed. In alternative embodiments, anti-extrusion structure 202 is formed in any manner and includes any material that enables seal 124 to operate as described herein. For example, in some embodiments, anti-extrusion structure 202 includes, without limitation, plastics, elastomers, metals, and combinations thereof In reference to FIGS. 7 and 8, in the exemplary embodiment, anti-extrusion structure 202 is coupled to elastic layer 204 such that portions of elastic layer 204 extend into spaces 222 and contact ribs 208 and elongate member 206. Accordingly, seal 200 is configured to provide increased contact area between anti-extrusion structure 202 and elastic layer 204 to facilitate anti-extrusion structure 202 bonding to elastic layer 204. In the exemplary embodiment, elastic layer 204 substantially covers anti-extrusion structure 202 such that anti-extrusion structure 202 is substantially isolated from an exterior of seal 200. In alternative embodiments, anti-extrusion structure 202 and elastic layer 204 are coupled in any manner that enables seal 200 to operate as described herein.

Figure 9:
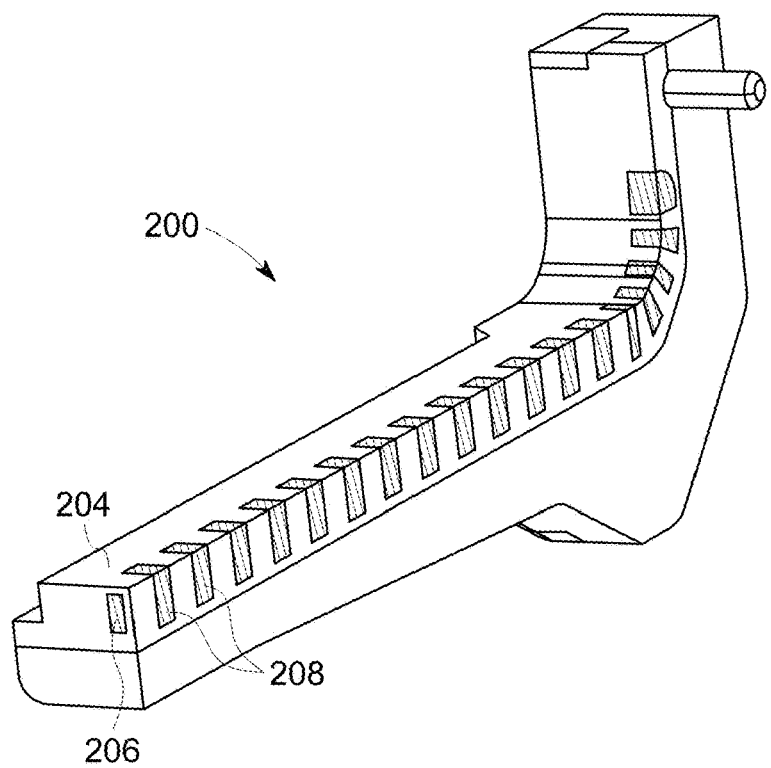
FIG. 9 is a perspective view of a different configuration of the seal shown in FIG. 7.

FIG. 9 is a perspective view of another configuration of seal 200. The configuration of seal 200 shown in FIG. 9 is substantially similar to the configuration shown in FIG. 7, except ribs 208 extend to the exterior of seal 200. Elongate member 206 is substantially covered by elastic layer 204. In alternative embodiments, elastic layer 204 covers any portion of anti-extrusion structure 202 that enables seal 200 to operate as described herein. For example, in some embodiments, some ribs 208 extend to the exterior of seal 200 and some ribs 208 are covered by elastic layer 204.

Figure 10:
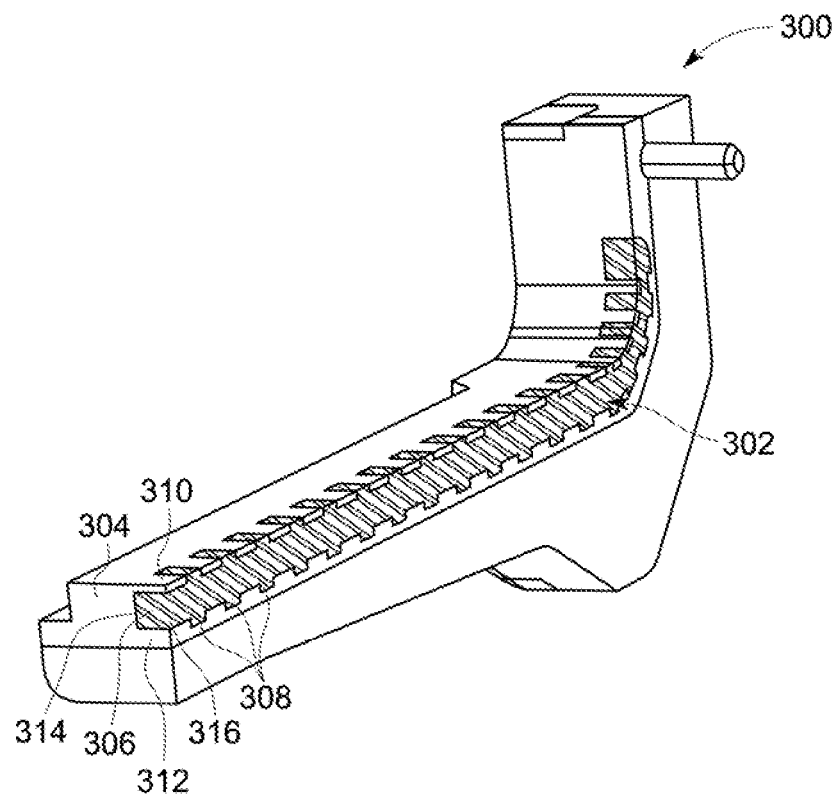
FIG. 10 is a perspective view of a portion of an alternative exemplary seal including a ribbed anti-extrusion structure.

FIG. 10 is a perspective view of a portion of a seal 300 for blind shear ram 102 (shown in FIG. 3). Seal 300 includes an anti-extrusion structure 302 and an elastic layer 304. Anti-extrusion structure 302 includes an elongate member 306 and ribs 308. Elongate member 306 includes a first surface 310, a second surface 312, a third surface 314, and a fourth surface 316. Ribs 308 extend about a portion of elongate member 306. Specifically, ribs 308 extend about second surface 312, third surface 314, and fourth surface 316. Accordingly, anti-extrusion structure 302 is asymmetric relative to a longitudinal axis of anti-extrusion structure 302. In alternative embodiments, seal 300 includes any anti-extrusion structure 302 that enables anti-extrusion structure 302 to operate as described herein.

In the exemplary embodiment, anti-extrusion structure 302 is coupled to elastic layer 304 such anti-extrusion structure 302 is partially covered by elastic layer 304. At least a portion of ribs 308 and first surface 310 are uncovered such that ribs 308 and first surface 310 are exposed to an exterior of seal 300. In alternative embodiments, anti-extrusion structure 302 and elastic layer 304 are coupled together in any manner that enables seal 300 to operate as described herein.

Figure 11:
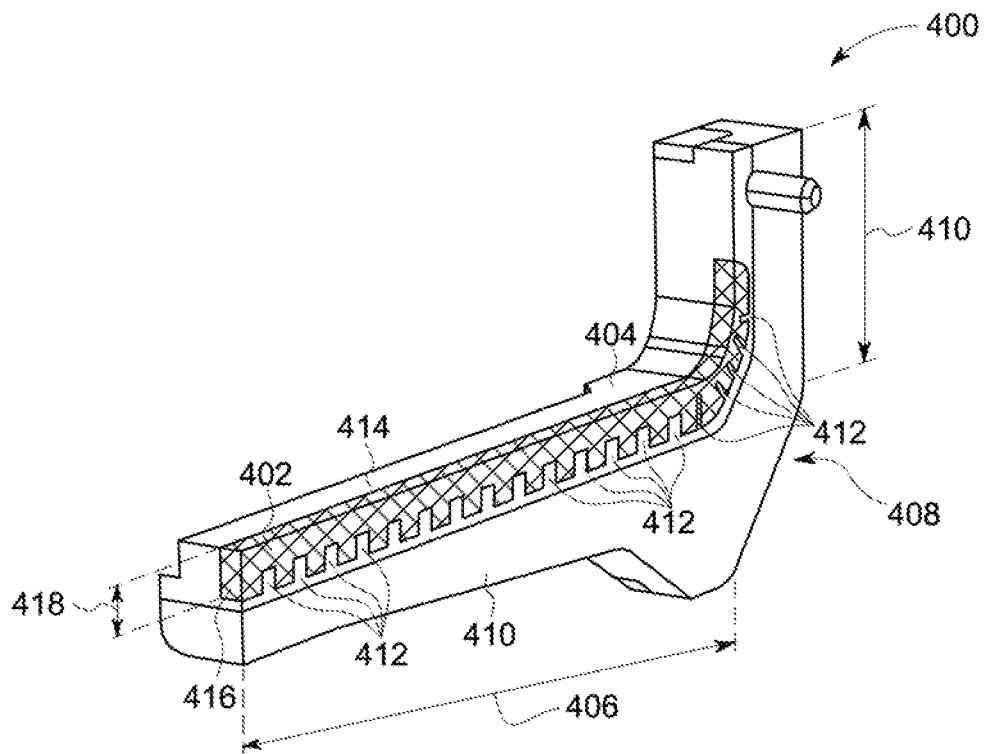
FIG. 11 is a perspective view of a portion of an alternative exemplary seal including an anti-extrusion structure including slits.

FIG. 11 is a perspective view of a portion of a seal 400 for blind shear ram 102 (shown in FIG. 3). Seal 400 includes an anti-extrusion structure 402, an elastic layer 404, a base portion 406, elbows 408, and leg portions 410. Leg portions 410 extend at angles relative to base portion 406 and are coupled to opposite ends of base portion 406 by elbows 408. Accordingly, seal 400 is U-shaped. Anti-extrusion structure 402 extends through base portion 406, through elbows 408, and into leg portions 410. Anti-extrusion structure 402 conforms to a shape of base portion 406, elbows 408, and leg portions 410. Elbows 408 form curved portions of anti-extrusion structure between base portion 406 and leg portions 410. Accordingly, anti-extrusion structure 402 is at least partially curved. In alternative embodiments, seal 400 has any shape that enables seal 400 to operate as described herein.

In the exemplary embodiment, anti-extrusion structure 402 defines a plurality of slits 412 to facilitate anti-extrusion structure 402 conforming to different shapes and extending along elastic layer 404. In particular, slits 412 allow anti-extrusion structure 402 to have a curved shape and extend through elbow 408. Anti-extrusion structure 402 is positioned such that slits 412 are spaced throughout elbow 408 when anti-extrusion structure 402 is coupled to elastic layer 404. Slits 412 are narrow, substantially linear openings extending into anti-extrusion structure 402. In alternative embodiments, anti-extrusion structure 402 includes any slit 412 that enables anti-extrusion structure 402 to operate as described herein. For example, in some embodiments, slits 412 are spaced throughout anti-extrusion structure 402. In further embodiments, different portions of anti-extrusion structure 402 define different slits 412.

Also, in the exemplary embodiment, elastic layer 404 is coupled to anti-extrusion structure 402 such that portions of elastic layer 404 extend into slits 412. Accordingly, slits 412 increase the surface area available for bonding between elastic layer 404 and anti-extrusion structure 402. In alternative embodiments, anti-extrusion structure 402 and elastic layer 404 are coupled together in any manner that enables seal 400 to operate as described herein.

In addition, in the exemplary embodiment, anti-extrusion structure 402 includes a first surface 414 and a second surface 416. First surface 414 and second surface 416 define a thickness 418 therebetween. In some embodiments, thickness 418 is in a range of about 13 mm (0.5 in.) to about 127 mm (5 in.). In alternative embodiments, anti-extrusion structure 402 has any thickness that enables anti-extrusion structure 402 to operate as described herein.

Also, in the exemplary embodiment, slits 412 extend from first surface 414 toward second surface 416 through a portion of thickness 418. In the exemplary embodiment, slits 412 extend through a majority, i.e., greater than half, of thickness 418. Accordingly, slits 412 decrease thickness 418 in portions of anti-extrusion structure 402 and allow anti-extrusion structure 402 to flex between different positions. In alternative embodiments, slits 412 extend any distance that enables seal 400 to operate as described herein.

Moreover, in the exemplary embodiment, adjacent slits 412 are spaced apart by a distance in a range of about 1 mm to about 10 mm. The material between slits 412 provides rigidity to seal 400 to resist extrusion forces. In particular, slits 412 are configured to allow anti-extrusion structure 402 to flex without substantially decreasing resistance to extrusion forces. In alternative embodiments, slits 412 are spaced apart any distance that enables seal 400 to operate as described herein.

In reference to FIGS. 1 and 11, a method of assembling blind shear ram 102 includes coupling seal 400 to at least one of lower carrier 118 and upper carrier 114 such that seal 400 is configured to seal wellbore 104 when upper carrier 114 and lower carrier 118 are in the closed position. In some embodiments, seal 400 is coupled to lower carrier 118 and base portion 406 is positioned in a groove in lower carrier 118. The method also includes forming elbow 408 between base portion 406 and leg portion 410 such that leg portion 410 extends at an angle relative to base portion 406. The method further includes providing elastic layer 404 extending through base portion 406 and elbow 408. Elastic layer 404 is configured to contact upper carrier 114 to seal wellbore 104 when blind shear ram 102 is in the closed position. The method also includes coupling anti-extrusion structure 402 to elastic layer 404 such that portions of elastic layer 404 extend into slits 412. In some embodiments, anti-extrusion structure 402 and elastic layer 404 are coupled together using adhesive. In further embodiments, anti-extrusion structure 402 and elastic layer 404 are coupled in any manner that enables seal 400 to operate as described herein. For example, in some embodiments, anti-extrusion structure 402 is at least partially embedded in elastic layer 404 during formation of seal 400.

In the exemplary embodiment, the method includes forming slits 412 in anti-extrusion structure 402 to facilitate anti-extrusion structure 402 extending through elbow 408. In particular, slits 412 provide flexibility to anti-extrusion structure 402 to allow anti-extrusion structure 402 to curve and conform to the shape of elbow 408. In some embodiments, slits 412 are formed by removing material from anti-extrusion structure 402, such as by cutting or "kerf-cutting" anti-extrusion structure 402. In further embodiments, slits 412 are formed into anti-extrusion structure 402 when anti-extrusion structure 402 is formed. In alternative embodiments, anti-extrusion structure 402 is formed in any manner that enables anti-extrusion structure 402 to operate as described herein.

The above-described methods and systems provide a seal that withstands extrusion forces in the wellbore and completely seals the wellbore. For example, embodiments of the seal include elastic layers and an anti-extrusion member coupled to the elastic layers to inhibit extrusion of the elastic layers. The anti-extrusion member extends between the elastic layers such that the anti-extrusion member supports the elastic layers. In addition, the outermost elastic layer covers the anti-extrusion member and contacts surfaces adjacent the seal to prevent materials moving between the seal and the surfaces. In some embodiments, the anti-extrusion member and the elastic layers are configured to increase bonding between the anti-extrusion member and the elastic layers. As a result, the seal provides increased contact pressure and resists extrusion forces due to pressures in the wellbore.

An exemplary technical effect of the methods, systems, and apparatus described herein includes at least one of: (a) increasing reliability of BOP systems; (b) providing seals for blind shear rams that have an increased resistance to extrusion during operation; (c) increasing sealing contact pressure of seals for blind shear rams; (d) increasing bonding between layers of seals for blind shear rams; and (e) reducing the cost to assemble seals for blind shear rams.

Exemplary embodiments of BOP methods, systems, and apparatus are not limited to the specific embodiments described herein, but rather, components of systems and/or steps of the methods may be utilized independently and separately from other components and/or steps described herein. For example, the methods may also be used in combination with other systems requiring seals, and are not limited to practice with only the systems and methods as described herein. Rather, the exemplary embodiment can be implemented and utilized in connection with many other applications, equipment, and systems that may benefit from improved seals.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A seal for a blind shear ram, said seal configured to extend between a first carrier and a second carrier of the blind shear ram, said seal comprising:
 a curved portion,
 an elastic layer extending through said curved portion, said elastic layer
 configured to contact at least one of the first carrier and the second carrier to seal a wellbore when the first carrier and the second carrier are in a closed position, said elastic layer having a first elasticity; and
 an anti-extrusion structure coupled to said elastic layer, said anti-extrusion structure configured as a single unitary piece and extending through said curved portion, said anti-extrusion structure having a second elasticity less than the first elasticity, wherein said anti-extrusion structure defines a plurality of slits to facilitate said anti-extrusion structure extending through said curved portion, the plurality of slits extending through at least a portion of a thickness of the anti-extrusion structure, the plurality of slits being defined by legs of the anti-extrusion structure, the legs being coupled together, wherein the elastic layer covers the anti-extrusion member and contacts surfaces adjacent the seal to prevent materials moving between the seal and the surfaces and further wherein portions of the elastic layer extend into the plurality of slits, further wherein the anti-extrusion structure prevents extrusion of the elastic layer, lateral displacement of seal due to extrusion forces and resists deformation of the seal due to pressures within wellbore.

2. The seal in accordance with claim 1, wherein said anti-extrusion structure is configured such that said plurality of slits are located within said curved portion.

3. The seal in accordance with claim 1, wherein said plurality of slits are located throughout said anti-extrusion structure.

4. The seal in accordance with claim 1, wherein said elastic layer and said anti-extrusion structure are coupled such that said elastic layer extends into each slit of said plurality of slits.

5. The seal in accordance with claim 1, wherein adjacent slits of said plurality of slits are spaced apart by a distance in a range of about 1 mm to about 10 mm.

6. The seal in accordance with claim 1, wherein said anti-extrusion structure comprises a first surface and a second surface, said first surface and said second surface defining a thickness of said anti-extrusion structure therebetween, said plurality of slits extending from said first surface toward said second surface.

7. The seal in accordance with claim 1, wherein said curved portion is a first curved portion, said seal further comprising a second curved portion, wherein said elastic layer and said anti-extrusion structure extend through said first curved portion and said second curved portion.

8. The seal in accordance with claim 7, wherein said plurality of slits is a first plurality of slits located within said first curved portion, said anti-extrusion structure further defining a second plurality of slits located within said second curved portion.

9. A blind shear ram for a blowout prevention system, said blind shear ram comprising:
a casing configured to couple to a stack and receive at least one pipe and at least one cable, the at least one pipe and the at least one cable extending through a wellbore defined by the stack;
an upper carrier comprising an upper blade;
a lower carrier comprising a lower blade, at least one of said upper carrier and said lower carrier configured to move relative to said casing such that said upper carrier and said lower carrier are positionable in a first position in which said upper carrier and said lower carrier are spaced apart and a second position in which said upper carrier and said lower carrier seal the wellbore; and
a seal extending between said upper carrier and said lower carrier, said seal comprising:
a curved portion,
an elastic layer extending through said curved portion, said elastic layer configured to contact at least one of said upper carrier and said lower carrier to seal the wellbore when said upper carrier and said lower carrier are in the second position, said elastic layer having a first elasticity; and
an anti-extrusion structure coupled to said elastic layer, said anti-extrusion structure configured as a single unitary piece and extending through said curved portion, said anti-extrusion structure having a second elasticity less than the first elasticity, wherein said anti-extrusion structure defines a plurality of slits to facilitate said anti-extrusion structure extending through said curved portion, the plurality of slits extending through at least a portion of a thickness of the anti-extrusion structure, the plurality of slits being defined by legs of the anti-extrusion structure, the legs being coupled together, wherein the elastic layer covers the anti-extrusion member and contacts surfaces adjacent the seal to prevent materials moving between the seal and the surfaces and further wherein portions of the elastic layer extend into the plurality of slits, further wherein the anti-extrusion structure prevents extrusion of the elastic layer, lateral displacement of seal due to extrusion forces and resists deformation of the seal due to pressures within wellbore.

10. The blind shear ram in accordance with claim 9, wherein said elastic layer and said anti-extrusion structure are coupled such that said elastic layer extends into each slit of said plurality of slits.

11. The blind shear ram in accordance with claim 9, wherein adjacent slits of said plurality of slits are spaced apart by a distance in a range of about 1 mm to about 10 mm.

12. The blind shear ram in accordance with claim 9, wherein said anti-extrusion structure comprises a first surface and a second surface, said first surface and said second surface defining a thickness of said anti-extrusion structure therebetween, said plurality of slits extending from said first surface toward said second surface.

13. The blind shear ram in accordance with claim 9, wherein said anti-extrusion structure is configured such that said plurality of slits are located within said curved portion.

14. The blind shear ram in accordance with claim 13, wherein said plurality of slits are located throughout said anti-extrusion structure.

15. The blind shear ram in accordance with claim 9, wherein said curved portion is a first curved portion, said seal further comprising a second curved portion, wherein said elastic layer and said anti-extrusion structure extend through said first curved portion and said second curved portion.

16. The blind shear ram in accordance with claim 15, wherein said plurality of slits is a first plurality of slits located within said first curved portion, said anti-extrusion structure further defining a second plurality of slits located within said second curved portion.

17. A method of assembling a seal for a blind shear ram, the seal configured to extend between a first carrier and a second carrier of the blind shear ram, said method comprising:
forming a curved portion between a base portion and a leg portion such that the leg portion extends at an angle relative to the base portion,
providing an elastic layer extending through the base portion and the curved portion, the elastic layer configured to contact at least one of the first carrier and the second carrier to seal a wellbore when the first carrier and the second carrier are in a closed position, the elastic layer having a first elasticity; and
coupling an anti-extrusion structure to the elastic layer, the anti-extrusion structure configured as a single unitary piece and extending through the base portion and the curved portion, the anti-extrusion structure having a second elasticity less than the first elasticity;

forming a plurality of slits in the anti-extrusion structure to facilitate the anti-extrusion structure extending through the curved portion, the plurality of slits extending through at least a portion of a thickness of the anti-extrusion structure, the plurality of slits being defined by legs of the anti-extrusion structure, the legs being coupled together, wherein the elastic layer covers the anti-extrusion member and contacts surfaces adjacent the seal to prevent materials moving between the seal and the surfaces and further wherein portions of the elastic layer extend into the plurality of slits; and preventing extrusion of the elastic layer, lateral displacement of seal due to extrusion forces and resisting deformation of the seal due to pressures within wellbore.

18. The method in accordance with claim 17, wherein coupling the anti-extrusion structure to the elastic layer comprises coupling the anti-extrusion structure to the elastic layer such that the elastic layer extends into each slit of the plurality of slits.

19. The method in accordance with claim 17, wherein forming a plurality of slits in the anti-extrusion structure comprises forming a plurality of slits extending from a first surface of the anti-extrusion structure toward a second surface of the anti-extrusion structure.

20. The method in accordance with claim 17 further comprising positioning said anti-extrusion structure such that the plurality of slits are located within the curved portion.

\* \* \* \* \*